US011246454B2

(12) United States Patent
Crowley

(10) Patent No.: US 11,246,454 B2
(45) Date of Patent: Feb. 15, 2022

(54) SPICE AND HERB FINGER GRINDER

(71) Applicant: Rosalind Louise Crowley, Fairfield, CA (US)

(72) Inventor: Rosalind Louise Crowley, Fairfield, CA (US)

(*) Notice: Subject to any disclaimer, the term of this patent is extended or adjusted under 35 U.S.C. 154(b) by 256 days.

(21) Appl. No.: 16/381,717

(22) Filed: Apr. 11, 2019

(65) Prior Publication Data
US 2019/0313857 A1 Oct. 17, 2019

Related U.S. Application Data

(63) Continuation-in-part of application No. 29/643,733, filed on Apr. 11, 2018, now Pat. No. Des. 925,824, and a continuation-in-part of application No. 29/651,417, filed on Aug. 10, 2018, now abandoned, and a continuation-in-part of application No. 29/651,437, filed on Nov. 5, 2018, now Pat. No. Des. 887,633, and a continuation-in-part of application No. 29/651,544, filed on Aug. 27, 2018.

(51) Int. Cl.
*A47J 43/25* (2006.01)
*A47J 42/34* (2006.01)

(52) U.S. Cl.
CPC ............... *A47J 43/25* (2013.01); *A47J 42/34* (2013.01)

(58) Field of Classification Search
CPC .. A47J 42/14; A47J 42/34; A47J 43/25; A61J 7/0007
USPC ................... 241/95, 168, 273.1; 99/623, 626
See application file for complete search history.

(56) References Cited

U.S. PATENT DOCUMENTS

| | | | |
|---|---|---|---|
| 1,799,562 A | 4/1931 | Kurtz et al. | |
| 2,077,540 A | 4/1937 | Welker | |
| 3,728,736 A * | 4/1973 | Pugh | A41D 13/087 2/21 |
| 3,734,003 A | 5/1973 | Gerson | |
| 4,615,078 A * | 10/1986 | Teich | A47J 17/00 294/25 |
| 5,234,142 A | 8/1993 | Loewen et al. | |
| 5,404,644 A * | 4/1995 | Needham | A01G 20/30 30/123 |

(Continued)

OTHER PUBLICATIONS

Lisa Waddle, "Fingertip protection", May 22, 2018.
"Handi-Grate™ 2-in-1 Grater & Slicer", May 22, 2018.

*Primary Examiner* — Faye Francis
*Assistant Examiner* — Jared O Brown
(74) *Attorney, Agent, or Firm* — Perkins Coie LLP; Julia A. Thomas

(57) ABSTRACT

A fingertip grinder mechanism is provided with which a user can manually grind spices, herbs, and other organic materials without pain, fatigue, or other discomforts. Five specific types of fingertip grinders include the thumb grinder, the fore fingertip grinder, the two fingertip grinder, the three fingertip grinder, and the four fingertip grinder. An individual puts on one type of fingertip grinder on one hand and another type on the other hand and proceeds to rub their hands back and forth together to effect the grinding of the contents between the hands. The grinder element can have holes as well as the grinding spikes and a tray built in under the grinder element to catch and store the residue of the grinding process that enters through the holes. Magnets can be embedded in the fingertip elements so that they can cling to each other and not get misplaced.

19 Claims, 22 Drawing Sheets

(56) References Cited

U.S. PATENT DOCUMENTS

| | | | |
|---|---|---|---|
| 5,826,599 A | 10/1998 | Adams | |
| 6,721,987 B2 | 4/2004 | McDevitt et al. | |
| D492,117 S | 6/2004 | Sarkar et al. | |
| 6,860,441 B2 | 3/2005 | Richardson | |
| 7,020,898 B1 * | 4/2006 | Pucci | A47L 13/18 2/161.6 |
| 7,421,787 B2 | 9/2008 | White et al. | |
| 7,743,690 B2 | 6/2010 | White et al. | |
| D695,003 S | 12/2013 | Lee et al. | |
| 8,844,080 B2 | 9/2014 | Stacy | |
| 8,857,747 B2 | 10/2014 | Goto | |
| D738,626 S | 9/2015 | Wagner | |
| 10,952,566 B2 * | 3/2021 | Guetta | A47J 43/25 |
| 2003/0056274 A1 | 3/2003 | Sorrels | |
| 2004/0098868 A1 | 5/2004 | Pieper | |
| 2004/0217219 A1 | 11/2004 | Bitonto et al. | |
| 2006/0200912 A1 * | 9/2006 | Jackson | B25G 1/102 7/110 |
| 2006/0211352 A1 | 9/2006 | Adams | |
| 2010/0142332 A1 * | 6/2010 | Hiranuma | G04B 37/005 368/310 |
| 2014/0090179 A1 | 4/2014 | Stacy | |
| 2015/0029746 A1 * | 1/2015 | Campbell | A41D 3/00 362/606 |
| 2015/0047204 A1 * | 2/2015 | Stacy | A47J 43/25 30/123 |
| 2016/0029691 A1 * | 2/2016 | Ruzycky | A47J 42/12 241/24.1 |
| 2016/0242807 A1 | 8/2016 | Castillo-Garcia et al. | |
| 2017/0215494 A1 * | 8/2017 | Savides | A47J 17/10 |
| 2017/0245541 A1 | 8/2017 | Pagan | |
| 2018/0049595 A1 * | 2/2018 | Leibovitch | A47J 43/25 |
| 2019/0142192 A1 * | 5/2019 | Rampersd | A47G 21/001 294/99.2 |

* cited by examiner

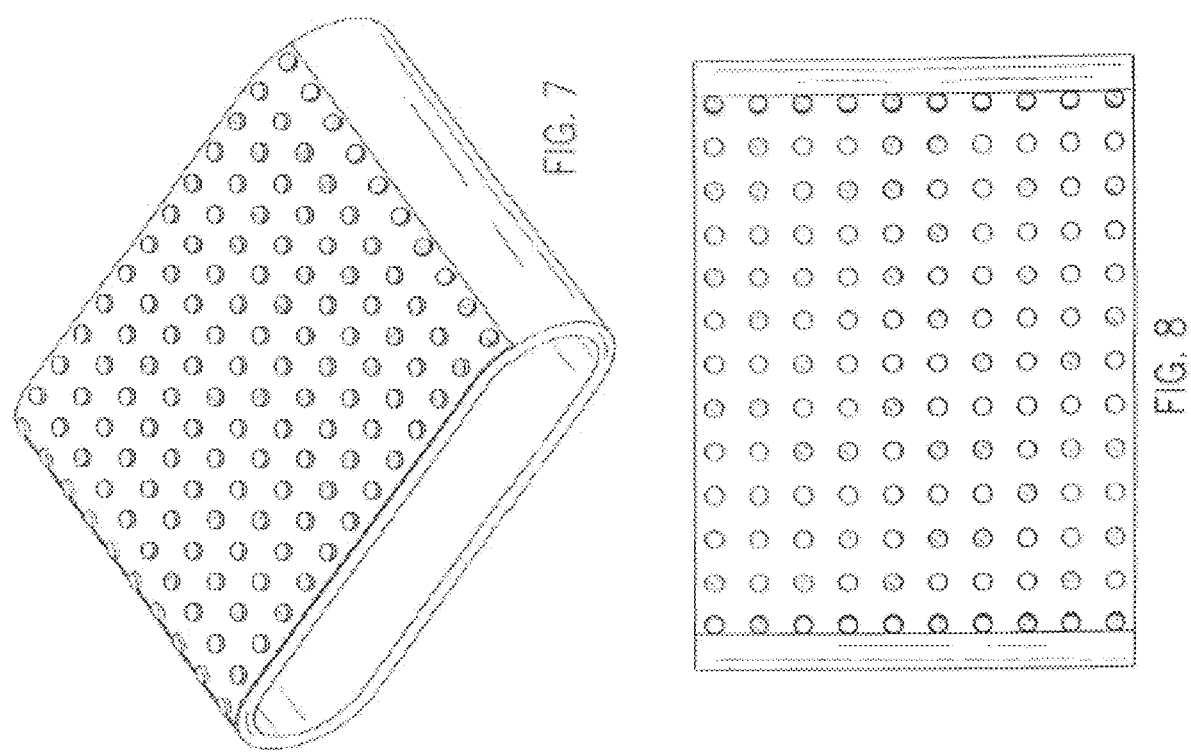

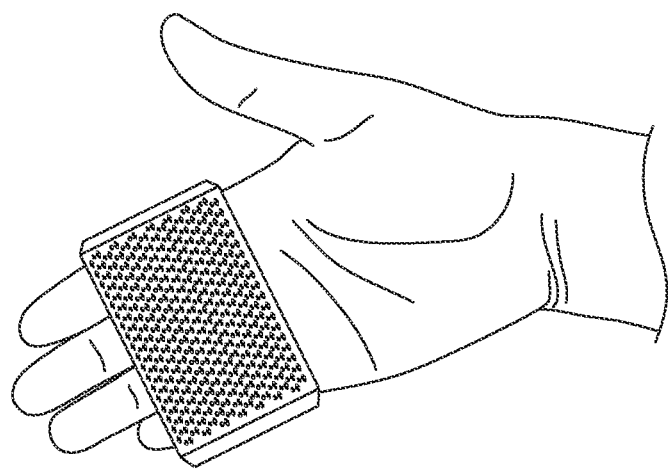
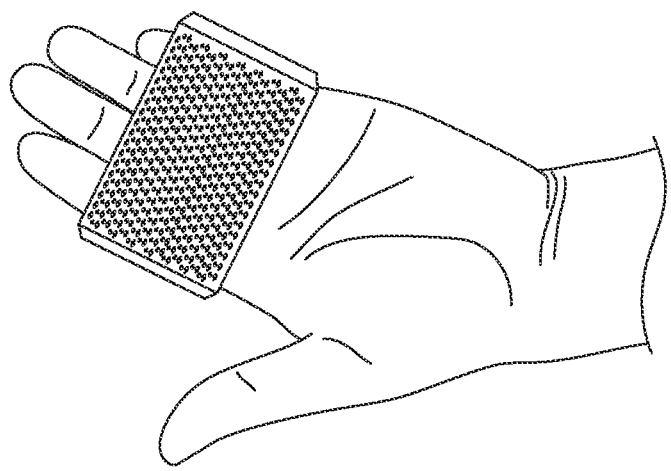
FIG. 16

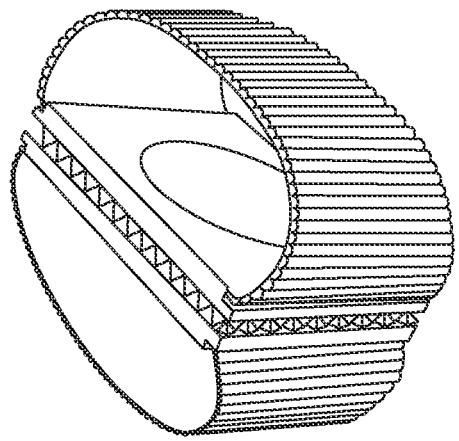
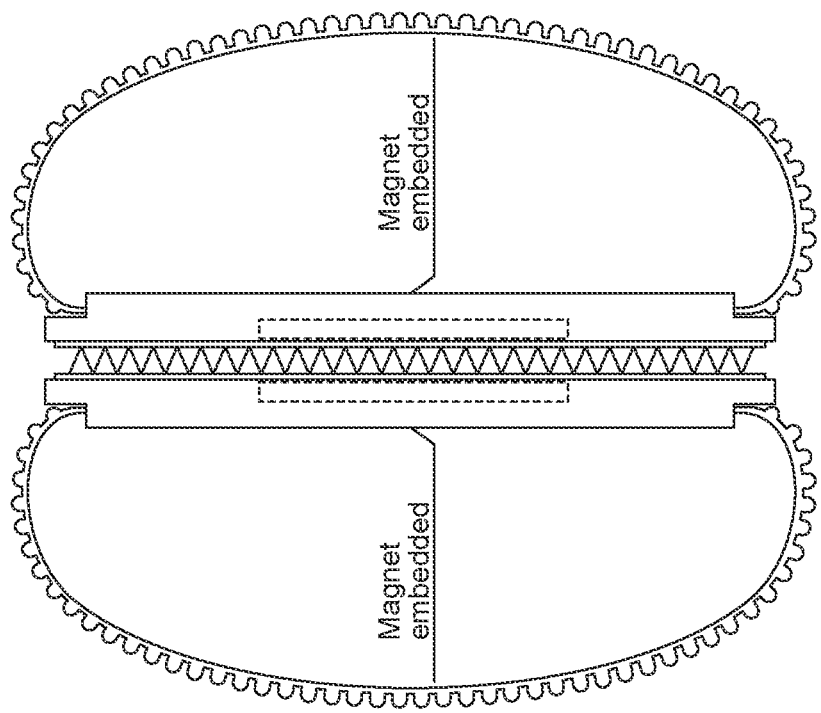
FIG. 19

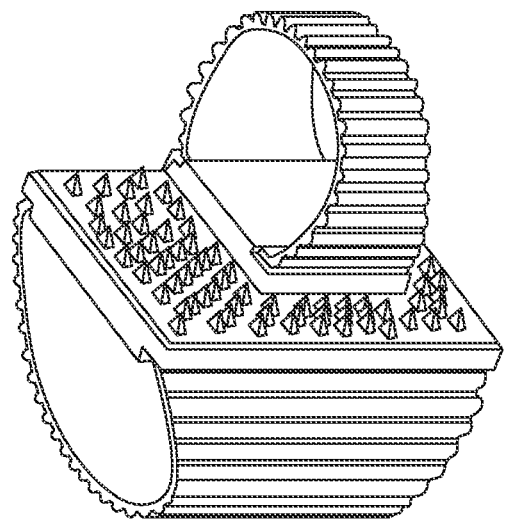
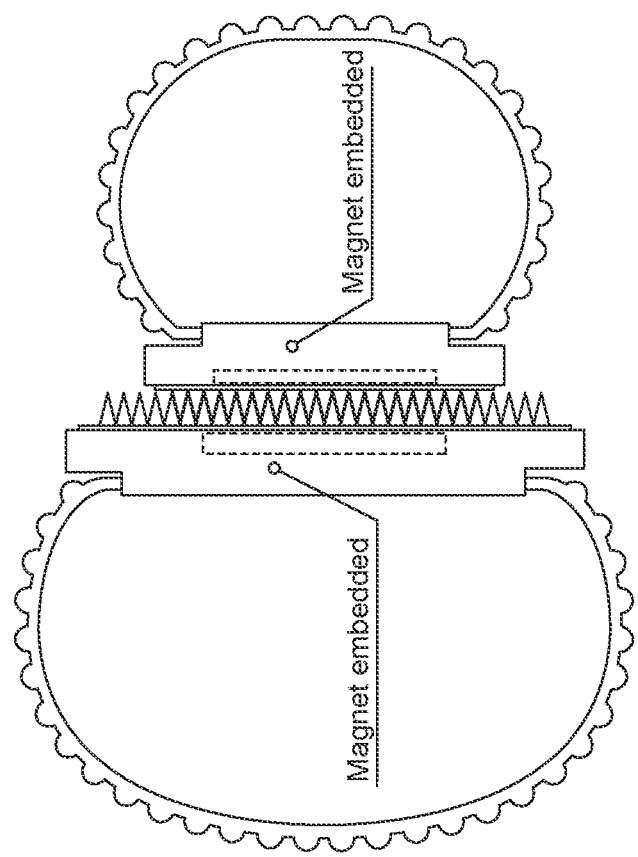
FIG. 20

SPICE AND HERB FINGER GRINDER

This patent application is a continuation-in-part of U.S. design patent application Ser. No. 29/643,733, FINGERTIP GRINDER, filed Apr. 11, 2018; of U.S. design patent application Ser. No. 29/651,417, FINGERTIPS GRINDER, filed Aug. 10, 2018; of U.S. design patent application Ser. No. 29/651,437, FINGERTIP GRINDER, filed Nov. 5, 2018; and of U.S. design patent application Ser. No. 29/651,544, FINGERTIPS GRINDER, filed Aug. 27, 2018, the entirety of each of which is incorporated herein by this reference thereto.

BACKGROUND OF THE INVENTION

Technical Field

This invention relates generally to the field of hand utensils for grinding materials. More specifically, this invention relates to the grinding of spices or herbs using a mechanism fitted onto an individual's hands.

Description of the Related Art

Present day manual grinders are bulky containers and difficult with which to work. The casings are made of alloy, medal, or wood and typically are small and round; one casing consisting of sharp points. One inserts the spice or herb inside the container and performs a back-and-forth twisting motion to grind the material inside. However, such mechanism or use of such has been found to hurt one's hands or arms after a short period of time. For example, it can cause the palm of one's hand to hurt, e.g. burn, or for the forearms to feel fatigued. Also, if a person has small hands, they may feel more pain or discomfort than other users with larger arms or hands. Therefore, typical manual grinders are found to be difficult to use.

SUMMARY OF THE INVENTION

A fingertip grinder mechanism is provided with which a user can manually grind spices, herbs, and other organic materials without pain, fatigue, or other discomforts. Five specific types of fingertip grinders include the thumb grinder, the fore fingertip grinder, the two fingertip grinder, the three fingertip grinder, and the four fingertip grinder. An individual puts on one type of fingertip grinder on one hand and another type on the other hand and proceeds to rub their hands back and forth together to effect the grinding of the contents between the hands. The grinder element can have holes as well as the grinding spikes and a tray built in under the grinder element to catch and store the residue of the grinding process that enters through the holes. Magnets can be embedded in the fingertip elements so that they can cling to each other and not get misplaced.

BRIEF DESCRIPTION OF THE DRAWINGS

FIG. 7 is a front perspective view of finger grinder according to an embodiment;

FIG. 8 is a front elevation view of the finger grinder according to an embodiment;

FIG. 16 is a schematic diagram showing two four fingertip grinders, according to an embodiment;

FIG. 19 is a schematic diagram showing two four fingertip grinders that are attached together by embedded magnets, according to an embodiment;

FIG. 20 is a schematic diagram showing a two fingertip grinder and a thumb grinder that are attached together by embedded magnets, according to an embodiment;

DETAILED DESCRIPTION

Figure 1:
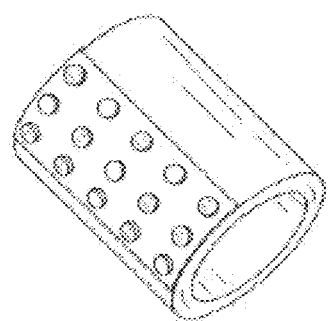
FIG. 1 is a front perspective of the finger grinder according to an embodiment.

A fingertip grinder mechanism is provided with which a user can manually grind spices, herbs, and other organic materials without pain, fatigue, or other discomforts. Five specific types of fingertip grinders include the thumb grinder, the fore fingertip grinder, the two fingertip grinder, the three fingertip grinder, and the four fingertip grinder. An individual puts on one type of fingertip grinder on one hand and another type on the other hand and proceeds to rub their hands back and forth together to effect the grinding of the contents between the hands. The grinder element can have holes as well as the grinding spikes and a tray built in under the grinder element to catch and store the residue of the grinding process that enters through the holes. Magnets can be embedded in the fingertip elements so that they can cling to each other and not get misplaced.

A fingertip grinder can be referred to herein also as a finger grinder, a grinder element, or simply a grinder.

Present day manual grinders are bulky containers and difficult with which to work. The casings are made of alloy, medal, or wood and typically are small and round; one casing consisting of sharp points. One inserts the spice or herb inside the container and performs a back-and-forth twisting motion to grind the material inside. However, such mechanism or use of such has been found to hurt one's hands or arms after a short period of time. For example, it can cause the palm of one's hand to hurt, e.g. burn, or for the forearms to feel fatigued. Also, if a person has small hands, they may feel more pain or discomfort than other users with larger arms or hands. Therefore, typical manual grinders are found to be difficult to use.

Thus, the innovation provides an easier grinding apparatus and method. In an embodiment, each of the two hands of an individual wears a grinder part, having places a receptacle, e.g. a bowl or piece of paper, underneath the hands and rubs the hands together in a back and forth motion with the spice or herb in between the grinder parts. The innovation avoids the inflicted pain by some prior art grinders and is advantageously less complicated than prior art grinders, as well.

Also, it should be appreciated that it has been found that innovative spice grinder is easier to make than present-day prior art manual grinders.

Further, it should be appreciated that the innovative spice grinder is easier or more convenient with which to travel, e.g. one can slip the grinder into one's pocket or place into one's gym bag, and so on. In another embodiment, a chain or string can be attached to the spice grinder for attaching to a secure item such as the gym bag or purse, etc. Such chain or string can ensure that the innovative grinder is not lost and can avoid having to be stored within the bag or purse for a variety of reasons, such as the bag or purse is smelly, too small, etc. In an embodiment, the innovative grinder can be worn around a person's neck like a necklace or chain.

In an embodiment, a grinder is attached to the individual's hand or finger using reusable, self-gripping, adhesive tape or straps, such as for example, Velcro® elastic straps, other Velcro® general purpose hook and loops fasteners, leather straps, or plastic or metal clip-on backing. In another embodiment, an elastic, soft rubber is embedded into the body of the grinder to enable the grinder to stay attached to the individual's hand or finger. Any similar, flexible material that facilitates the grinder staying put on the individual's hand or finger while in use is contemplated herein. In accordance with various embodiments, the pliable grinder is constructed such that it can be easily pulled onto and off of the individual's hand or finger, such as for example an elastic band. An example of such type of material is ACE™ Brand Self-Adhering Elastic Bandage or ACE™ Elastic Bandage w/clips.

In an embodiment, such self-gripping material is attached to the base of the grinder or can be embedded into the grinder material itself.

In an embodiment, the panel surface is made of any of: alloy, metal, aluminum, wood, plastic, thermoplastic, polymers, or any type of material that can hold or support the grinding elements of the grinder or, put another way, that maintains the integrity of the grinding elements during grinding. It should be appreciated that while herein the grinding elements are referred to as spikes or thorns, such terminology is meant for understanding purposes only and is not meant to be limiting. In an embodiment, the base could be made using an injection mold with such appropriate materials. In another embodiment, the base is created by a 3D printer and is made of material that satisfies the attaching capabilities described above as well as being appropriate for a 3D printer. The base includes the protruding, sharp features, e.g. thorns or spikes, that achieve the grinded result. In an embodiment, the spikes can be pointed or flat-topped.

It should be appreciated that the robustness of the grinder allows it to be used to crack the shells of nuts, such as peanuts, pistachios, etc. For example, it is contemplated that the innovative grinder can be part of a parting gift bag or goodie bag, in which both the nuts and the innovative grinder to crack the shells of the nuts are added.

In various embodiments, the spacing of the spikes can vary. For example, they can be spaced such that when grinding tobacco by an individual vigorously rubbing the grinder bases together, the ground tobacco can easily fall in between the spikes or off of the grinder altogether and onto a separate platform, such as a tray or napkin. The spikes are close enough to grind the spice or leafy herb effectively into smaller pieces suitable for adding to cooking ingredients or for smoking, for example.

The grinder components can be worn and used interchangeably. For instance, an individual can choose to wear a grinder element on one finger on one hand and the larger grinder element, encompassing the four, non-thumb fingers, on the other hand to grind a spice. Or, in another arrangement, the individual can wear both large grinder elements, one on each hand, and can use the tray, stored in a tray slot compartment underneath the material holding the spikes as part of the base to catch any residue from the process of grinding. The tray element can slide out for the individual to access the residue therein. In various embodiment, the grinder includes: a thumb grinder element together with a two-finger grinder element; a thumb grinder element together with a four-finger grinder element; and two four-finger elements. However, other variations, e.g. a three-finger element, and combinations are possible and are contemplated.

The innovative fingertip grinder can be worn across the fingertips to grind organic material between two fingertip grinders. Various embodiment can be understood with reference to FIGS. 1-11, below. The broken lines consisting of evenly sized dash-dash-dash lines in the drawings depict environmental subject matter that form no part of the innovative design, while the broken lines consisting of unevenly sized dash-dot-dash lines in the drawings depict the boundary of the innovation and it is understood that the innovation extends to the boundary that forms no part of the innovative design.

Figure 2:
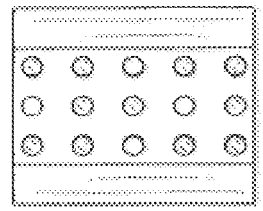
FIG. 2 is a front elevation view of the finger grinder according to an embodiment.
Figure 4:
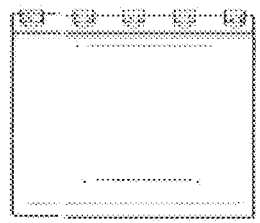
FIG. 4 is a left side elevation view of the finger grinder according to an embodiment, the right side elevation view being a mirror image thereof according to an embodiment.
Figure 5:
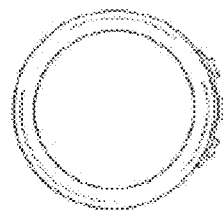
FIG. 5 is a top plan view of the finger grinder according to an embodiment, the bottom plan view being a mirror image thereof according to an embodiment.
Figure 3:
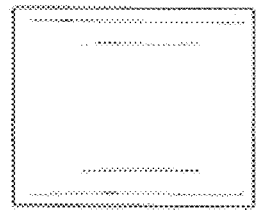
FIG. 3 is a rear elevation view of the finger grinder according to an embodiment.
Figure 6:
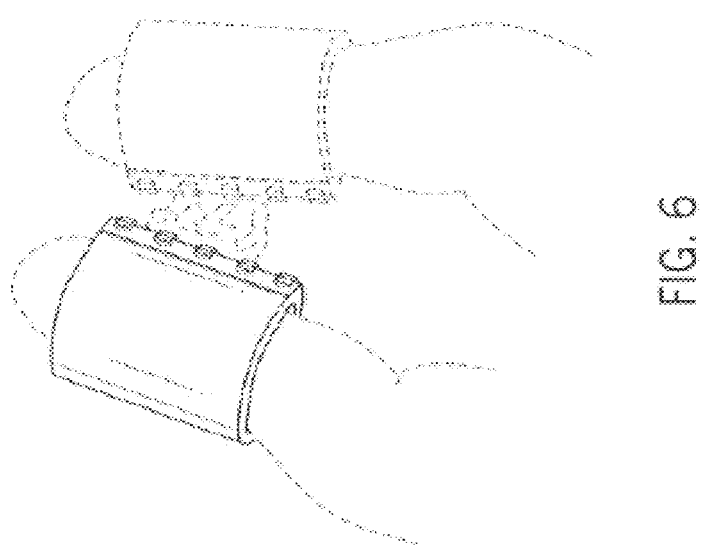
FIG. 6 is a perspective view the finger grinder in use according to an embodiment.
Figure 9:
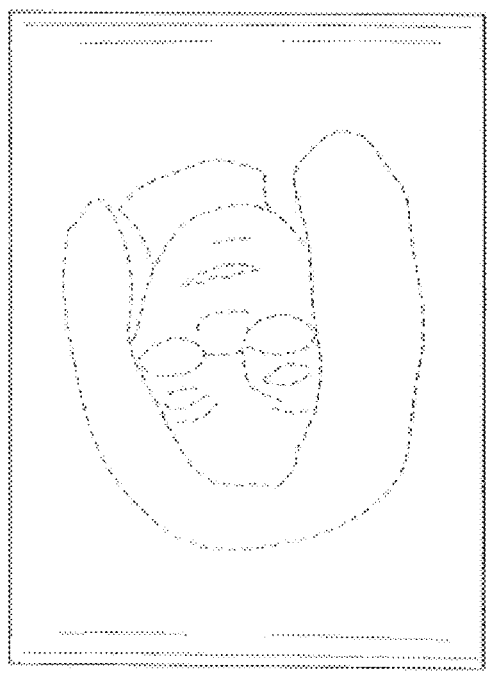
FIG. 9 is a rear elevation view of the finger grinder according to an embodiment.
Figure 10:
FIG. 10 is a left side elevation view of the finger grinder according to an embodiment, the right side elevation view being a mirror image thereof according to an embodiment.
Figure 11:
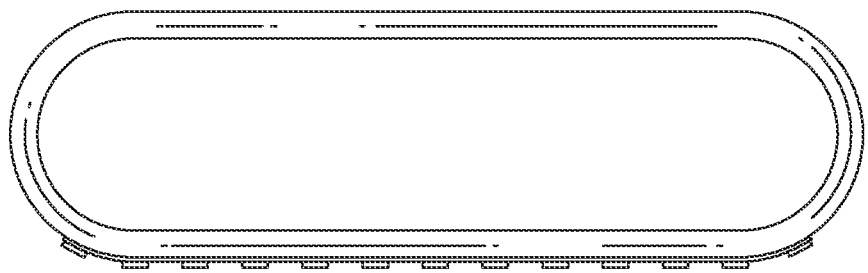
FIG. 11 is a top plan view of the finger grinder according to an embodiment, the bottom plan view being a mirror image thereof according to an embodiment.

In an embodiment, FIG. 1 is a front perspective of the finger grinder according to an embodiment. An individual can insert her finger into the hole to effectively wear the grinder. The 3-by-five array of smaller round circles represent the grinding elements, e.g. spikes or thorns, that protrude outward and grind the work piece (also referred to herein as content) when the two grinders are worn on the hands and the hands are rubbed together. FIG. 2 is a front elevation view of the finger grinder in FIG. 1 according to an embodiment. FIG. 3 is a rear elevation view of the finger grinder of FIG. 1. FIG. 4 is a left side elevation view of the finger grinder of FIG. 1, the right side elevation view being a mirror image thereof. FIG. 5 is a top plan view of the finger grinder of FIG. 1, the bottom plan view being a mirror image thereof. FIG. 6 is a perspective view the finger grinder of FIG. 1 in use according to an embodiment. The two fingers are rubbing together where the grinders meet and, thus, grinding the content therebetween. FIG. 7 is a front perspective view of a three or four finger grinder according to an embodiment. As in FIG. 1, the individual can insert her two, three, or four fingers, depending on the width of the grinder, into the hole to effectively wear the grinder. The large array of smaller round circles represents the spikes or thorns that protrude outward and grind the content when the two grinders are worn on the hands and the hands are rubbed together. FIG. 8 is a front elevation view of the finger grinder of FIG. 7. FIG. 9 is a rear elevation view of the finger grinder of FIG. 7. The finger grinder is personalized, sporting an image of a person wearing glasses on the rear or back. FIG. 10 is a left side elevation view of the finger grinder of FIG. 7, the right side elevation view being a mirror image thereof. FIG. 11 is a top plan view of the finger grinder, the bottom plan view being a mirror image thereof.

Figure 17:
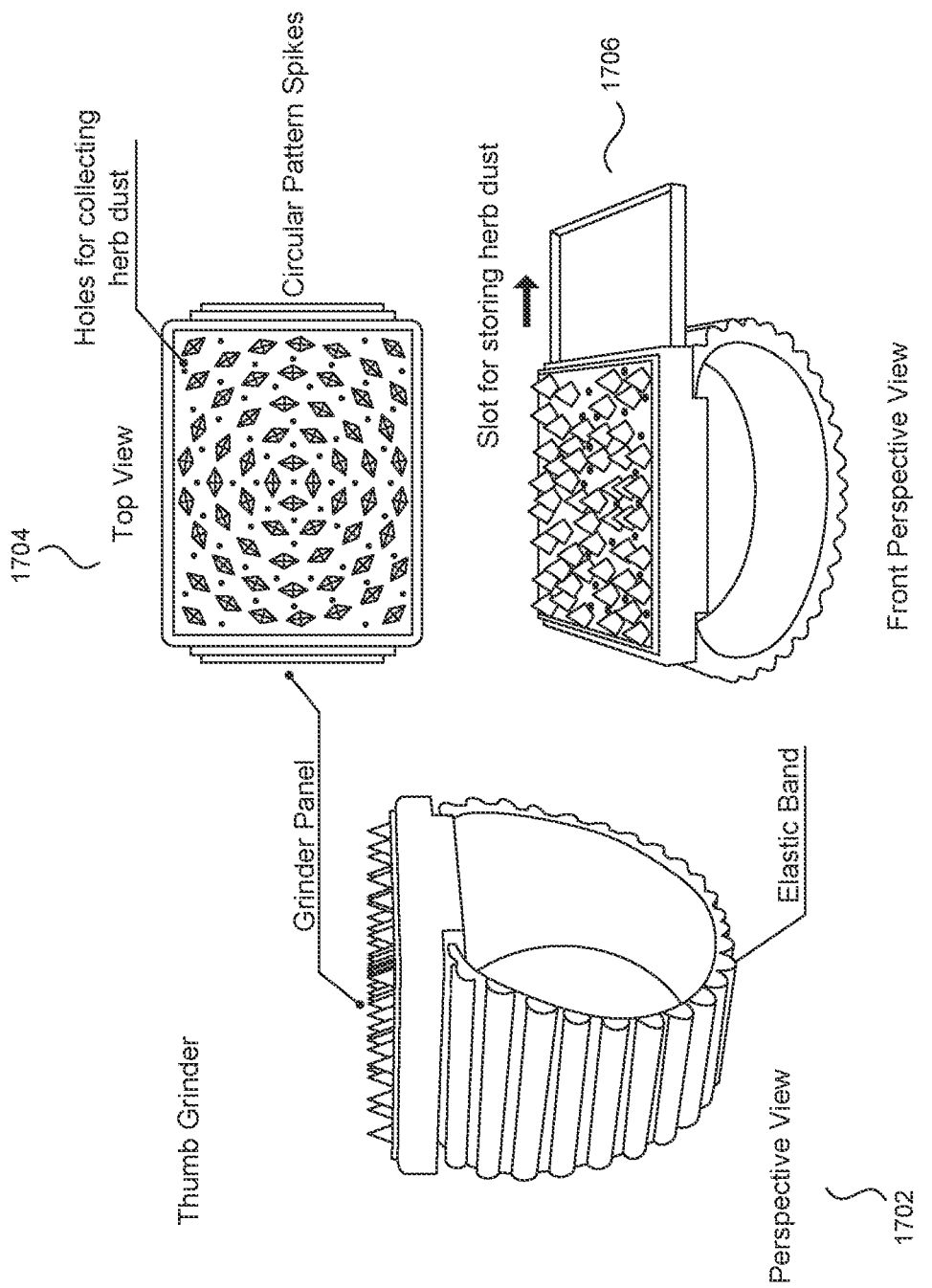
FIG. 17 is a schematic diagram showing a perspective view, top view, and front perspective view of the thumb fingertip grinder, according to an embodiment.
Figure 28:
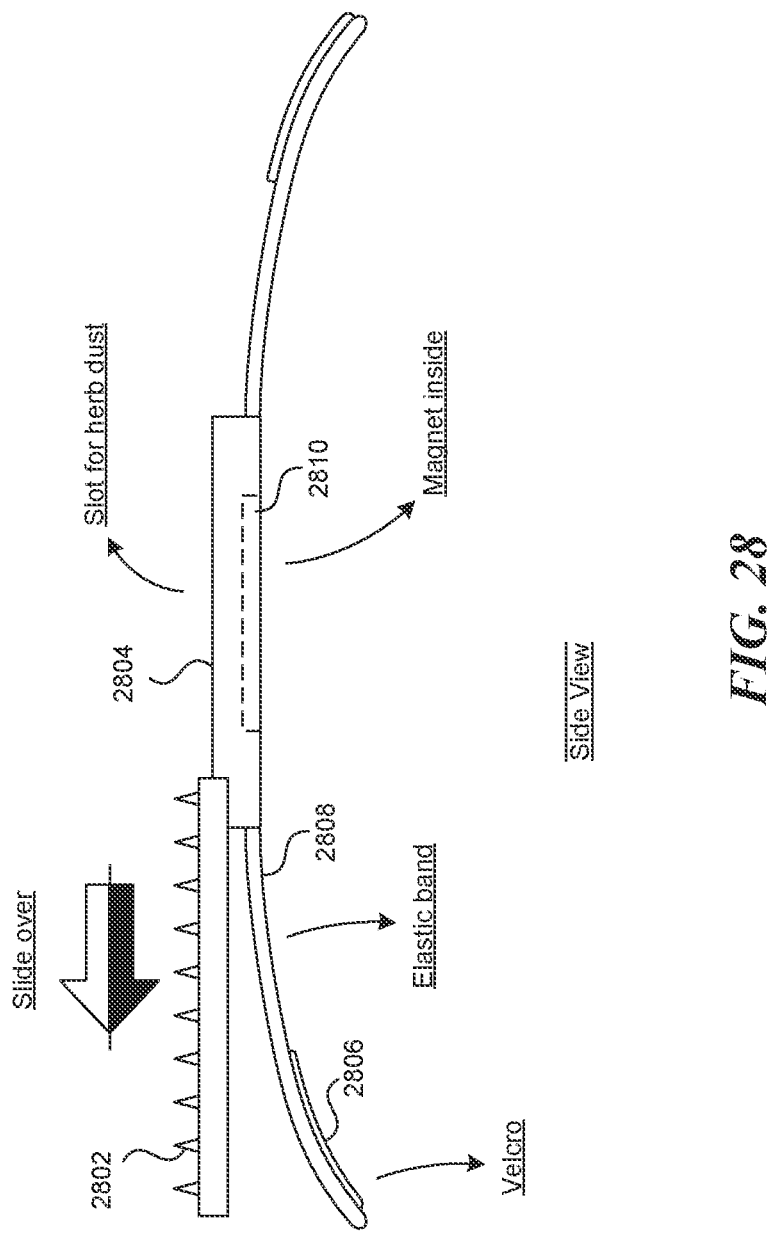
FIG. 28 is a schematic diagram showing the side view of the various features of the fingertip grinder, according to an embodiment.

In an embodiment, a slot or, interchangeably, tray is provided. An embodiment can be understood with reference to FIG. 17, a schematic diagram showing a perspective view 1702, top view 1704, and front perspective view of the thumb fingertip grinder. The slot or tray 1706 slides open and closed. In an embodiment, the tray has a tab, which, when slightly pulled, effects the popping open or closing of the tray. This a feature can be provided for each type of fingertip grinders individually, including the thumb. One purpose of the slot/tray is for collection of fine dust, grinded powder, or runoff end product. In an embodiment, the tray is made of a material that allows the tray to slide in and out easily and with minimal friction from under the grinder panel, itself. An embodiment can be understood with reference to FIG. 28, a schematic diagram showing the side view of the various features of the fingertip grinder. Grinder panel 2802 is shown having been slid over so that a user can access the slot or tray 2804 for herb dust.

In an embodiment, magnets are embedded into the center of the grinder. Each of the five types of grinders can have the magnet embedded within. An embodiment can be understood with reference to FIG. 19, a schematic diagram showing two four fingertip grinders that are attached together by embedded magnets. When each of two grinders have a magnet embedded therein, when the magnets come within magnetic range of each other, they are drawn to and attached together, e.g. as shown in FIG. 19. Such attached grinders are less likely to become misplaced or lost. They are kept together and as such they become a larger object, making the singular larger object less likely to be lost when compared to each single, smaller grinder. Also, as a larger object, the attached grinders may be more visible, thus less likely to become lost when compared to each single, smaller grinder. Another implementation can be understood with reference to FIG. 20. Two grinders of difference sizes are attached by magnets embedded in the centers of each. Having the magnets be in the center of the grinder enables the attachment to be centrally located, as well. Having centrally located magnet attachment may avoid them becoming separated because the exposed surface area is advantageously less exposed. When more surface area is exposed, the unit possesses a type of lopsidedness, where, should the unit fall or become knocked into, the exposed, larger surface area can press against a stronger object, forcing it away from the magnetic attraction smaller grinder. Thus, the grinders can become separated. However, it should be appreciated that the above-described embodiment is not limiting, and that the magnet can be embedded in any location under the grinding panel. Another embodiment of the embedded magnet can be understood with reference to FIG. 28, a schematic diagram showing the side view of the various features of the fingertip grinder. Embedded inside the tray unit is a magnet 2810.

Figure 13:
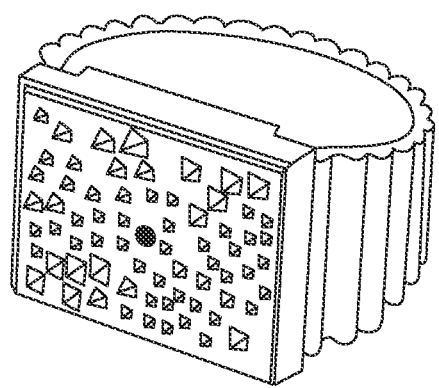
FIG. 13 is a photograph of a sample thumb with tray or one forefinger grinder, according to an embodiment.

In an embodiment, a grinder is oblong in shape and is about ½" longer than the thumb grinder. Such oblong grinder is made to fit the index or forefinger on either hand. In an embodiment, the oblong grinder has a slot/tray attached. Approximately 25-30 spikes or pointed sharp thorns are constructed in the grinder panel. Also, approximate 25-30 holes are added for collecting the dust or run-off, etc. An embodiment can be understood with reference to FIG. 6, showing two index grinders in grinding action, and FIG. 13, a photograph of a sample thumb with tray or one forefinger grinder.

Figure 15C:
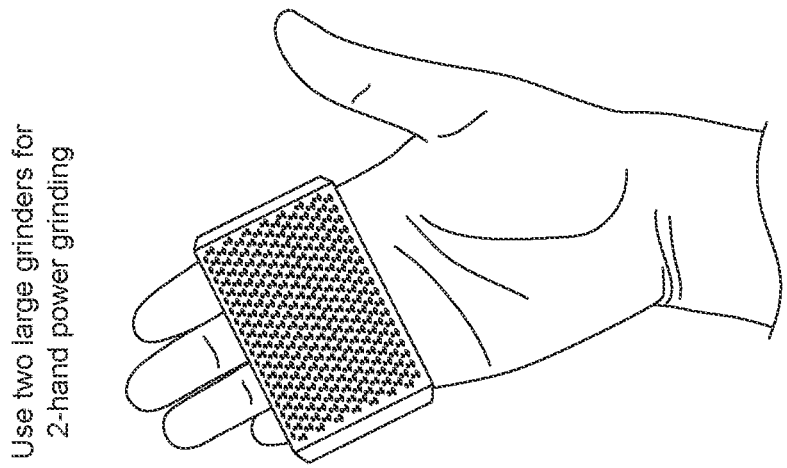
FIGS. 15A-C are schematic diagrams showing three different types of fingertip grinders, according to various embodiments.
Figure 15B:
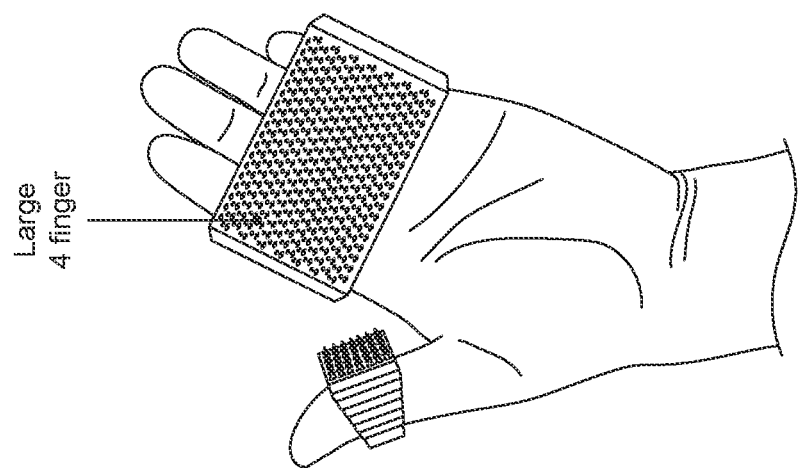
Figure 15A:
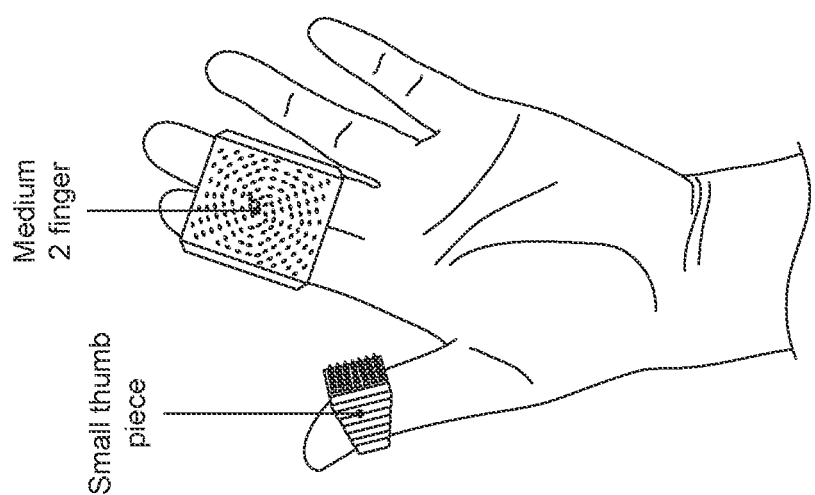

In an embodiment, the fingertip grinder fits the first fingertip which is the forefinger or index finger and the second fingertip together. An embodiment is shown in FIG. 15A, which is a schematic diagram showing a hand wearing a thumb grinder and the two fingertip grinder. In an embodiment, the two fingertip grinder has a tray and holes alongside each spike or pointed sharp thorn. There are approximately 30-70 holes beside each spike or sharp pointed thorn. An embodiment can be understood with reference to FIG. 27, a schematic diagram showing a two fingertip grinder and a thumb grinder in action.

Figure 14:
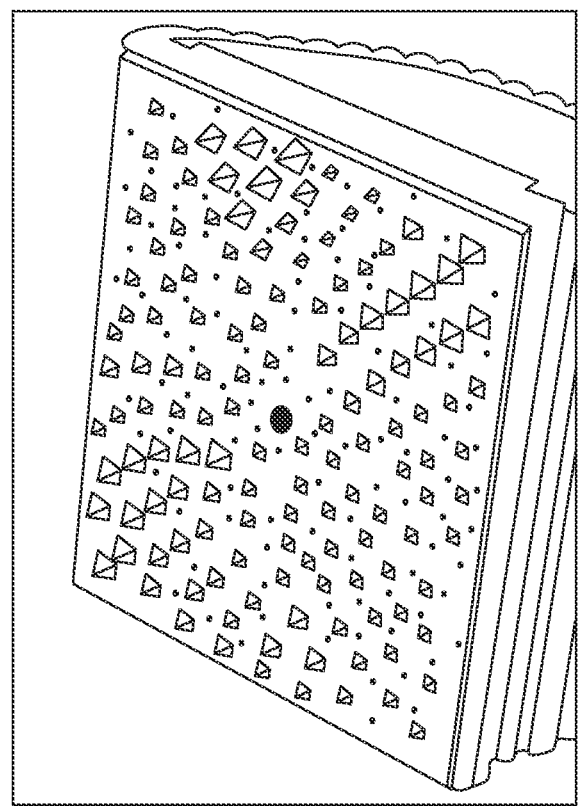
FIG. 14 is a photograph of a sample fingertip grinder, according to an embodiment.

In an embodiment, the four or three fingertip grinder fits around all three fingers, such as the index finger, the middle finger, and the third finger (e.g. the ring finger). In an embodiment, the size of the three fingertip grinder can be the same as the four fingertip grinder. Thus, the three fingertip grinder and the four fingertip grinder can be referred to herein interchangeably. An embodiment of the four fingertip grinder can be understood with reference to FIG. 15B, a schematic diagram showing one hand wearing a four fingertip grinder and a thumb grinder for grinding content by rubbing the thumb and the rest of the fingers together. Another embodiment can be understood with reference to FIGS. 15C and 16, depicting two four-fingertip grinders being used for grinding. An embodiment can be understood with reference to FIG. 14, a photograph of a sample fingertip grinder. In an embodiment, the three fingertip grinder has a tray and holes alongside each spike or pointed sharp thorn. The width and length equal to the four fingertip grinder, described below. Approximately 50-80 spikes and holes are included in the grinder panel.

Figure 12:
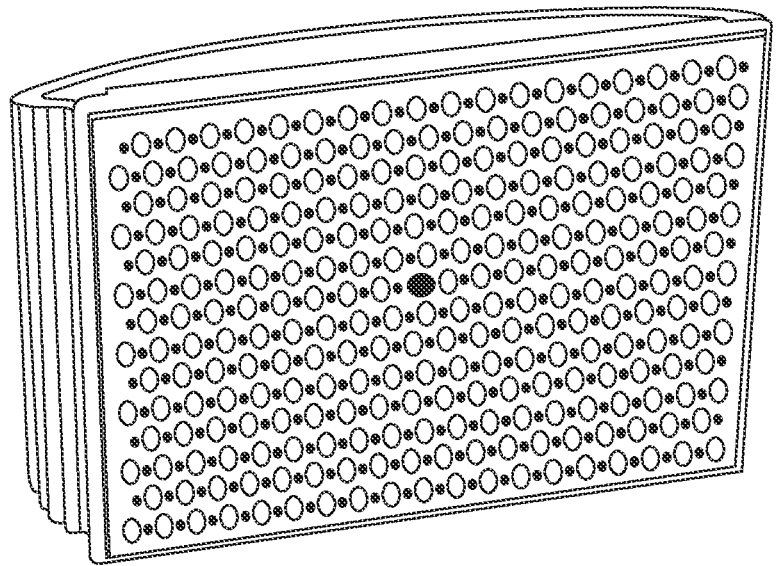
FIG. 12 is a photograph of a sample three or four fingertip grinder, according to an embodiment.
Figure 18:
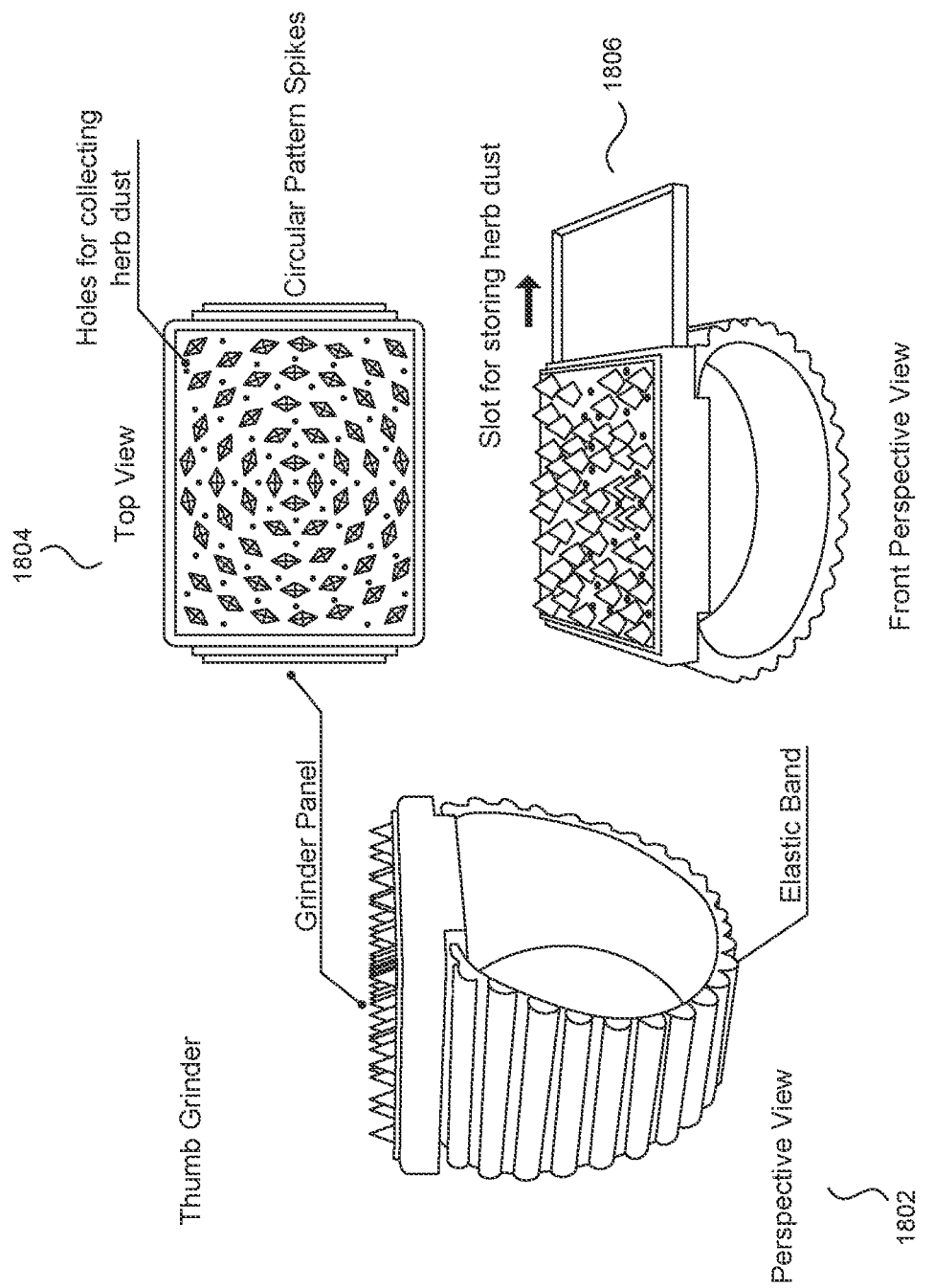
FIG. 18 is a schematic diagram showing a perspective view, top view, and front perspective view of the thumb fingertip grinder, according to an embodiment.
Figure 21:
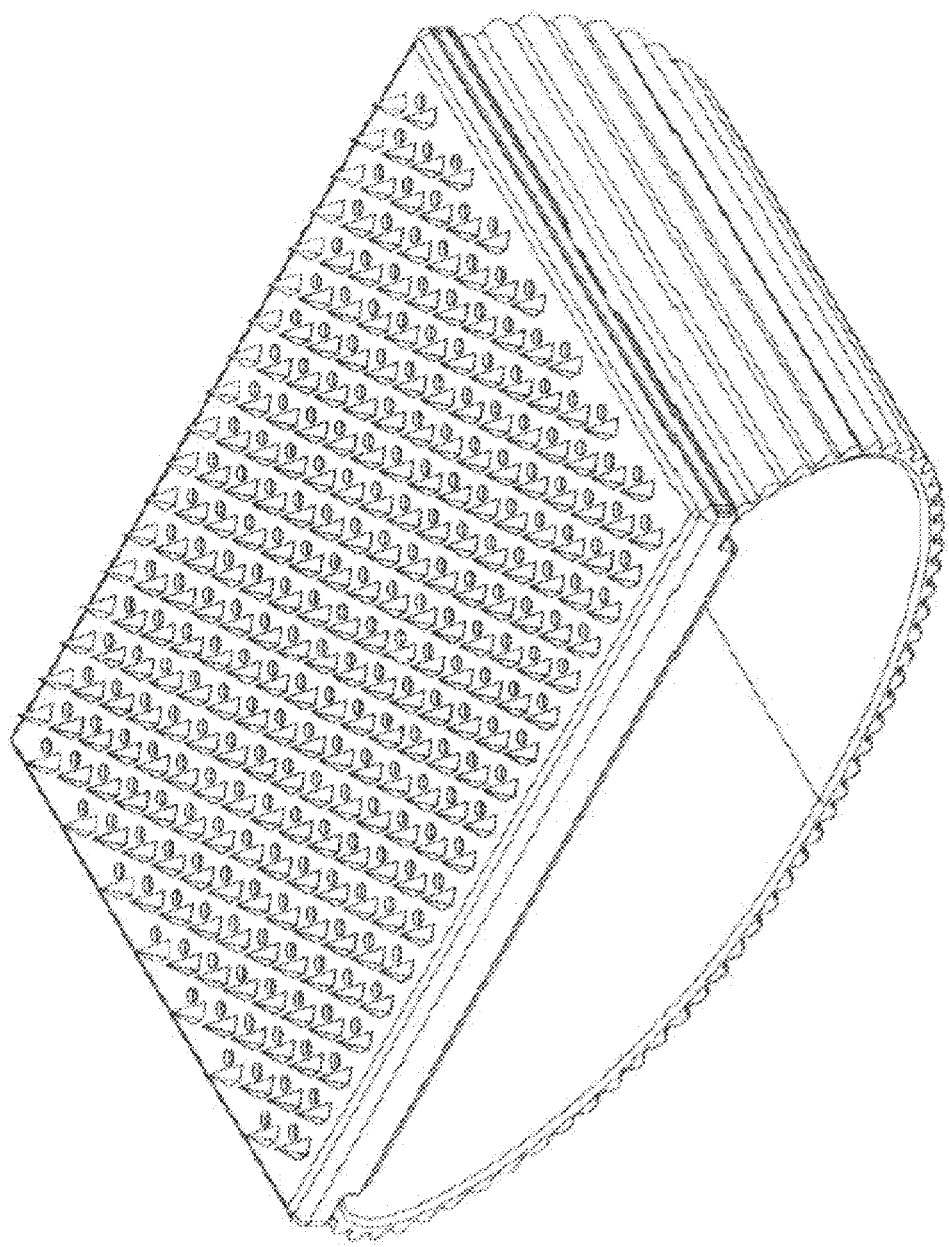
FIG. 21 is a schematic diagram of a four fingertip grinder, according to an embodiment.
Figure 22:
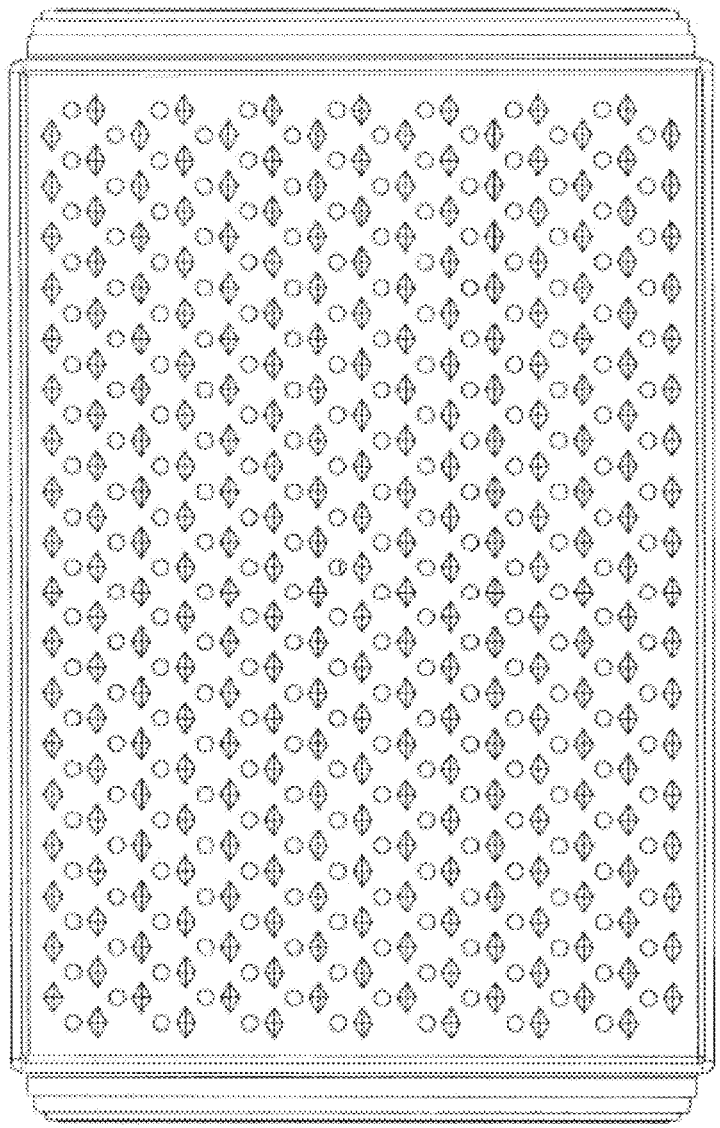
FIG. 22 is a schematic diagram of the top view of a four fingertip grinder, according to an embodiment.
Figure 23:
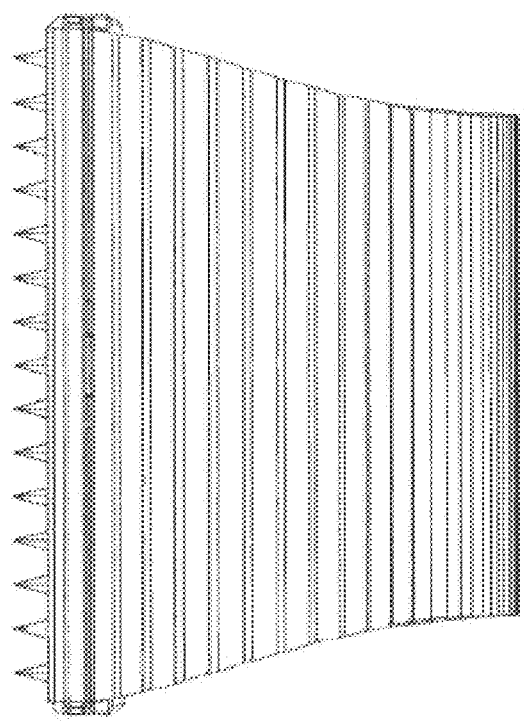
FIG. 23 is a schematic diagram of the side view of a four fingertip grinder, according to an embodiment.
Figure 24:
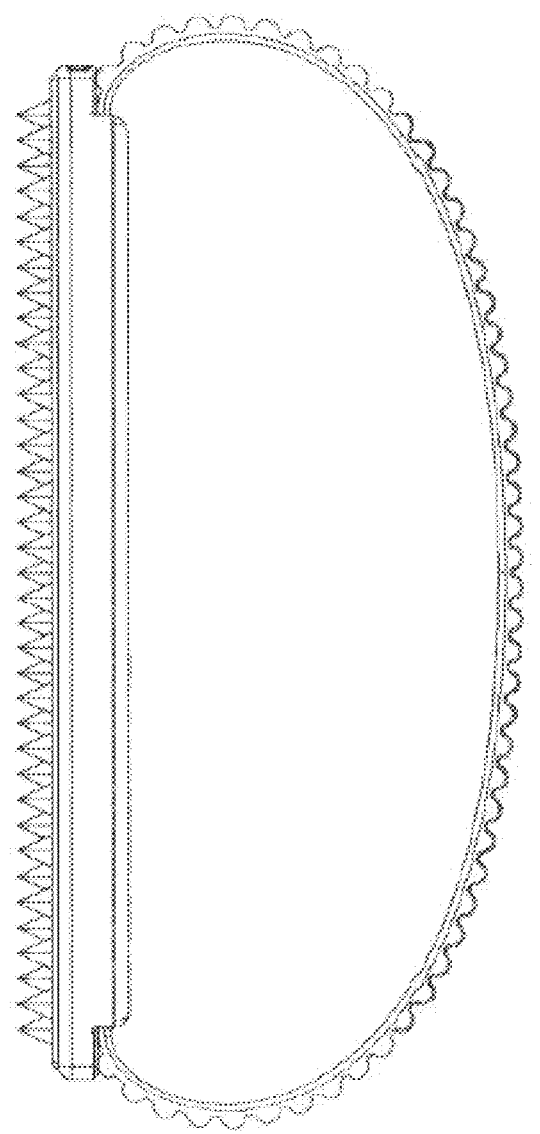
FIG. 24 is a schematic diagram of the front or back view of a four fingertip grinder, according to an embodiment.
Figure 27:
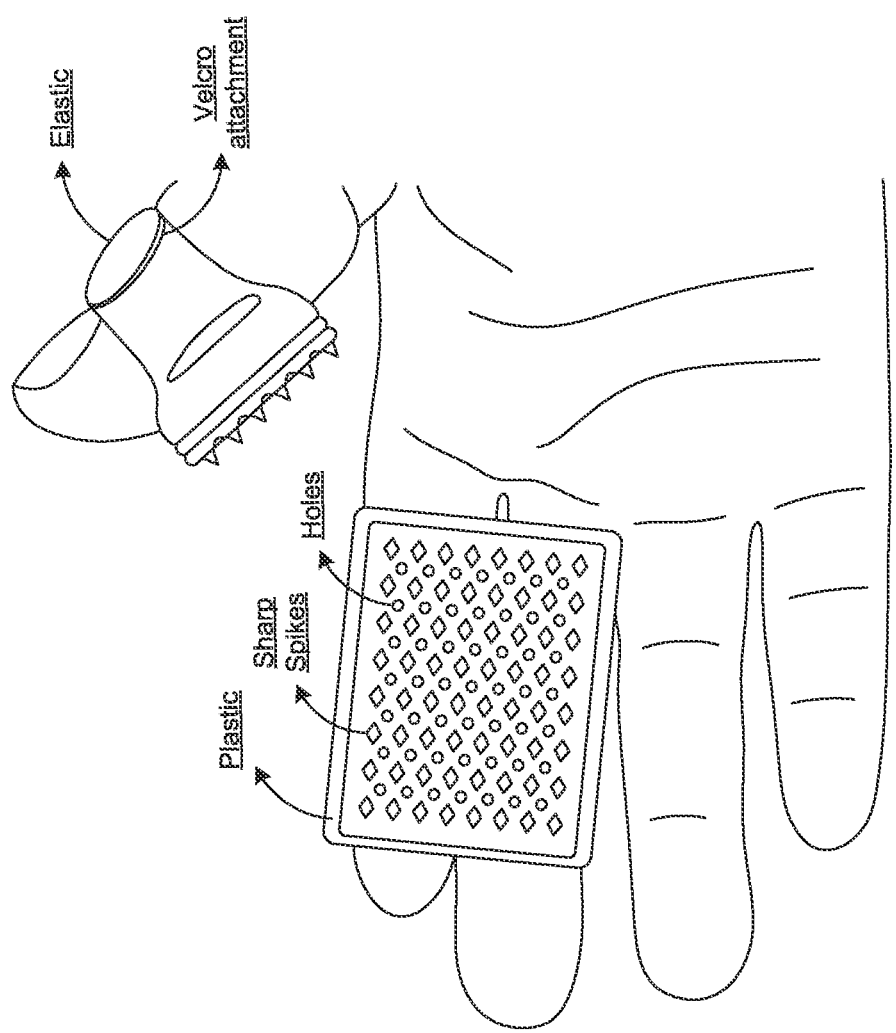
FIG. 27 is a schematic diagram showing a two fingertip grinder and a thumb grinder in action, according to an embodiment.

In an embodiment, the grinder comprises sharp or pointed spikes or thorns and small round holes beside each spike. One or more embodiments can be understood with reference to FIG. 12, a photograph of a sample three or four fingertip grinder. The spikes or thorns are the protruding parts of the metal and the holes are depicted by the small, black-looking circles. One or more embodiments can be understood with reference to FIG. 18. The top view 1804 shows the holes as black dots or small dark circles. The spikes are depicted in a circular pattern. An example of how high or far the spikes protrude relative to the grinder is shown in the perspective view 1802. The front perspective view 1806 also illustrate how high or far the spikes protrude relative to the grinder. FIGS. 21 and 22, each a schematic diagram of a four fingertip grinder, also clearly depict the array arrangement of the spikes and holes in accordance with one or more embodiments. FIG. 23, a schematic diagram of the side view of a four fingertip grinder, illustrates the relative dimensions of the spikes when compared to the wearable band of the grinder. FIG. 24, a schematic diagram of the front or back view of a four fingertip grinder, also illustrates the relative dimensions of the spikes when compared to the wearable band of the grinder. FIG. 27, a schematic diagram showing a two fingertip grinder and a thumb grinder in action, also illustrates the arrangement of the holes in comparison to the spikes, in an embodiment.

It should be appreciated that spikes and holes can go in a circular direction, e.g. as shown in 1804, as well as horizontal and vertical, e.g. as shown in FIGS. 21 and 22.

It should be appreciated that the number of round holes and shark spikes can range from approximately 60 to 235, depending on the size of the holes and spikes and the grinder area, as well. In an embodiment, the amount of the spikes/thorns and holes are dictated by the type of finger grinder and grinder size.

In an embodiment, the grinders can be made in sizes relative to each other such as small, medium, or large.

In an embodiment, all fingertip grinders are made of plastic or metal such that the spikes and the holes are made of such material, as described in further detail above.

In an embodiment, a string-type material, e.g. a chain, a thin braided cord or plastic cord, rope, cotton made material, etc., is provided for attaching to each grinder. Each of the five types of grinder can have a string. Such string can be short or long enough to attach to a backpack, a purse, a belt loop, a wristband, a key chain, a person's wrist, or to hang around a person's neck, so as to discourage a person losing the grinders. In an embodiment, the chain or string, etc., is embedded in the body as a whole of the foundation of the grinder. In an embodiment, the strings are embedded in the foundation of the body of the grinders or embedded in the securing back part of the elastic, rubber, self-adhesive straps, clip-ons, and other types of straps, etc.

In an embodiment, a cleaning case and kit is provided. The case or kit can include but is not limited to alcohol wipes, sanitary wipe pads, cotton swabs (e.g. Q-TIPS®), a miniature brush made of straw or plastic with a wood or plastic handle, and a small or miniature, thin and sharp pointed pick tool made of the same materials as the brush, e.g. plastic, wood, metal, aluminum. The purpose of the contents of the kit is to clean the fine powder away from the small holes and the tray, due to residues.

In an embodiment, a round empty space is created on the back or bottom of the four fingertips grinder. A photo, a logo, a brand name, customer's initials, the inventor's brand, the inventor's initials, a celebrity endorsement, a picture of one or more people or children such as healthy or ill people that are using the grinders to process medications, a picture of advocates supporting causes, can be glued on, taped on, or adhered to by any other fashion. Other examples of such images include but are not limited historical people, historical places of importance, e.g. in the United States, places important to specific communities or around the world, emojis, superheroes and super-sheroes, major league sports and sports figures, all with appropriate permissions, names of strains of herbs in the corresponding industry, and names of household herbs and spices.

Figure 25:
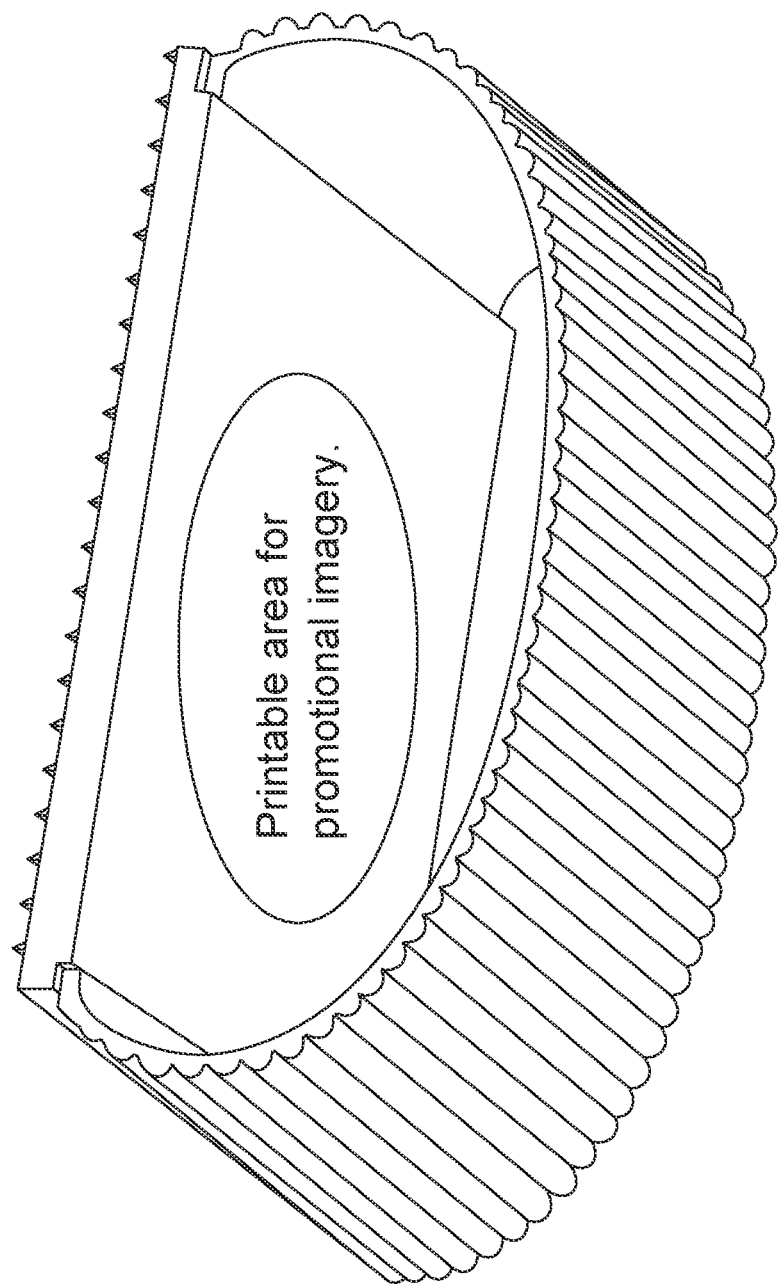
FIG. 25 is a schematic diagram of the bottom view of a four fingertip grinder showing a printable area for imagery, according to an embodiment.
Figure 26:
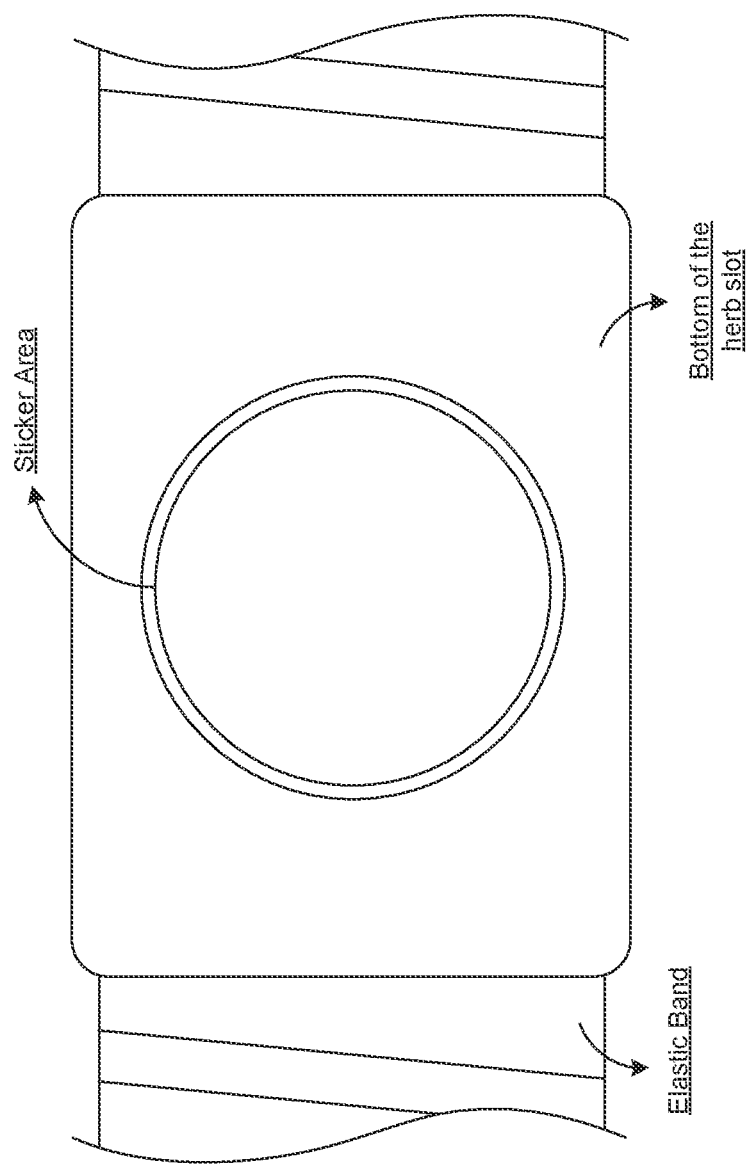
FIG. 26 is a schematic diagram showing a sticker area at the bottom of the fingertip grinder, according to an embodiment.
Figure 29:
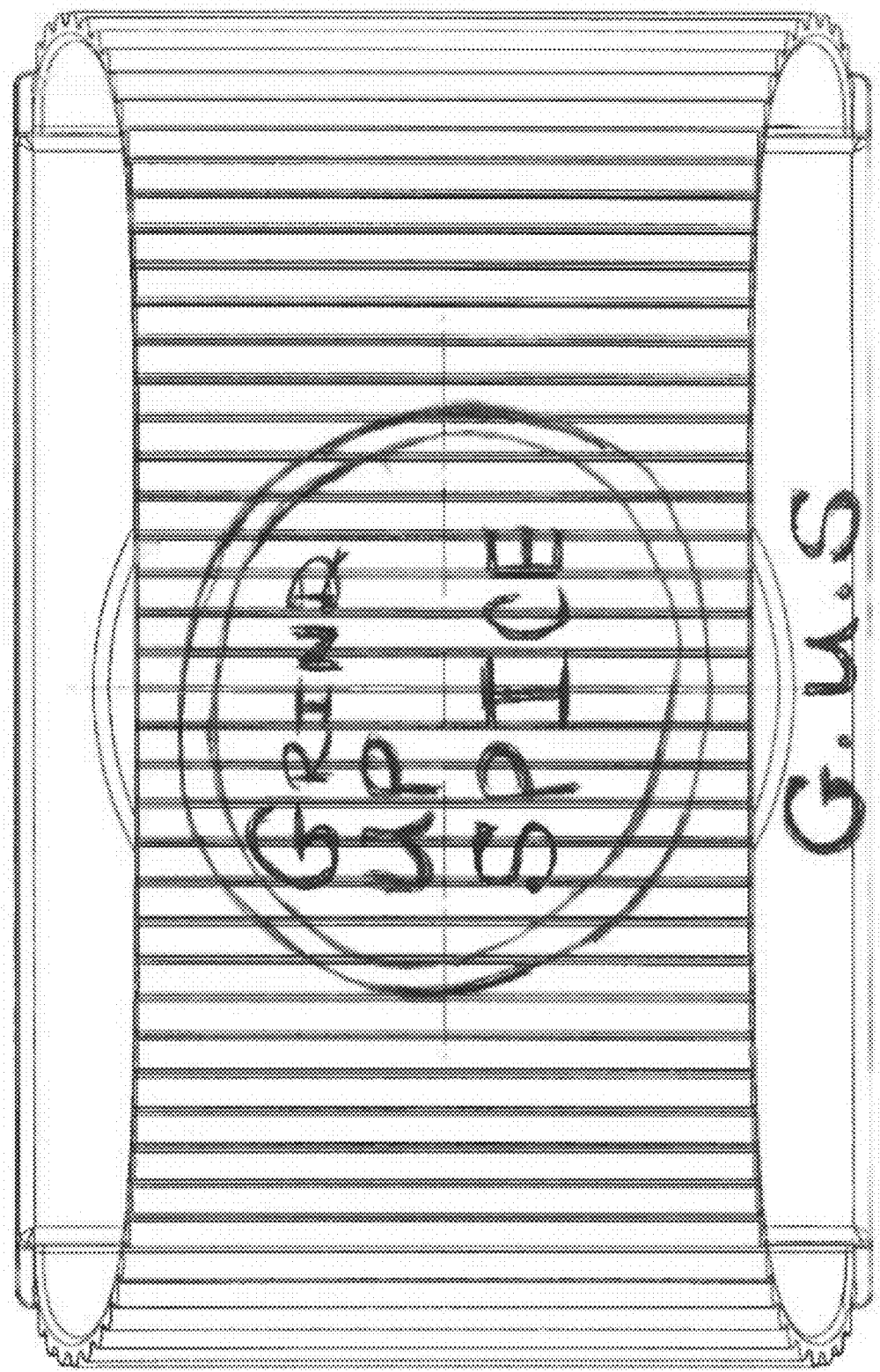
FIG. 29 is a schematic diagram showing a personalized fingertip grinder, according to an embodiment.

An embodiment can be understood with reference to FIG. 25, a schematic diagram of the bottom view of a four fingertip grinder showing a printable area for imagery. Also, FIG. 26 shows an example of a sticker area at the bottom of the fingertip grinder where such image can be adhered. FIG. 29 also shows an embodiment in which a logo or brand name or other identifying image is stamped onto the band element of the grinder. In another embodiment, the image can be adhered to the band element, as well. That is, the four fingertip grinder has the round space described above placed on the outside of the band over the knuckles, in accordance with an embodiment.

In an embodiment, the band secures to the back of the grinder and can be made of plastics, elastic, have Velcro® straps for bands or a plastic clip-on, as described hereinabove. All five fingertip grinders can be made to have the option to have one or the other type of materials to secure and attach to the back of the fingertips grinder. An embodiment can be understood with reference to FIG. 28, a schematic diagram showing the side view of the various features of the fingertip grinder. The elastic band 2808 has attached onto it a self-adhesive strap 2806, such as a Velcro® strap.

In one or more embodiments, the grinder elements are constructed in or from a variety of colors so that wearers can choose their preference. For example, grinders can be but are not limited to blue, green, lime, red, brown, white, clear, purple, or black.

In an embodiment, each type of fingertip grinder can be square, rectangular, or oval in shape.

In an embodiment, the fingertip grinders are constructed such that they can grind up tobacco, herbs, spices, and nuts, such as pistachio and peanuts.

In an embodiment, the back of each type of fingertip grinder can have on the bottom of the holding tray/slot and all around on the elastic band section accessories (e.g. "bling") built into the back. Such accessories can also be added into the securing sections of the plastic, self-adhesive band, leather straps, and so on. An example is depicted in FIG. 29, where "Grind Up Spice" can the two circles surrounding the words can be embedded into the band material itself.

Examples of materials used for accessorizing include but are not limited to all varieties of colors of gold, silver, platinum, glitter particles, diamonds, other gems, cubic zirconia, costume jewelry, pearls, and rhinestones. As mentioned above, each type of accessory can be put on the band itself, which can be made of elastic, and on the body of the fingertip grinder itself.

In an embodiment, personalized effects such as red, white and blue stars and stripes of the flag of the United States can be embedded in the image area or in the surrounding body and foundation. For example, such materials can be embedded in clear and color plastics in the center or in the surrounding foundation.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A system comprising:
a first grinding device; and
a second grinding device;
wherein the grinding devices are configured to grind material between them when the grinding devices meet and rub together;

wherein each grinding device comprises a panel having a surface comprising one or more spikes or thorns thereon for grinding the material; and wherein each grinding device comprises a band attached to the panel to removably secure the grinding device onto a user's hand or one or more fingers of the hand; and wherein at least one of the grinding devices further comprises a tray for collecting powder, runoff end product, or residue of the ground work piece, the tray positioned beneath the panel surface during grinding.

2. The system of claim 1, wherein each of the grinding devices is selectably constructed so that it can fit onto any of:
a thumb of the hand;
a forefinger of the hand;
the forefinger and the middle finger, both of the hand;
the forefinger, the middle finger, and the fourth finger, all of the hand;
the forefinger, the middle finger, and the fourth finger, all of the hand; and
the forefinger, the middle finger, the fourth finger, and the pinky, all of the hand.

3. The system of claim 1, wherein the panel and tray are connected such that the panel is slidable over and off of the tray to cover the tray or effect accessibility to a tray container, respectively.

4. The system of claim 1, wherein the panel and tray are connected such that the tray is slidable underneath and out from the panel to hide the tray or effect accessibility to the tray.

5. The system of claim 1, wherein the panel surface of at least one of the grinding devices comprises a plurality of holes so that powder, runoff end product, or residue can fall through the plurality of holes during grinding.

6. The system of claim 1, wherein the panel surface of each of the grinding devices, including the spikes or thorns, is made of: alloy, metal, aluminum, wood, plastic, thermoplastic, one or more polymers.

7. The system of claim 1, wherein the spikes or thorns are pointed or flat-topped.

8. The system of claim 1, wherein the number of spikes or thorns on the panel surface of at least one of the grinding devices is in the range of 25-235.

9. The system of claim 1, wherein the grinding devices are further configured to grind herb, a spice, or a nut.

10. The system of claim 1, wherein the band of at least one of the grinding devices is made of an elastic or soft rubber and is embedded into a body of the panel to facilitate attaching the at least one of the grinding devices to the hand or finger.

11. The system of claim 1, wherein the band of at least one of the grinding devices comprises any of or any combination of:
reusable, self-gripping, adhesive tape or straps;
a hook and loop fastener; or
leather straps.

12. The system of claim 1, wherein the spikes or thorns of the grinding devices are selectably arranged in a horizontal and vertical pattern or a circular pattern, depending on the desired effectiveness to grind the material.

13. The system of claim 1, wherein the two grinding devices are configured to fit different finger types.

14. The system of claim 1, wherein each of the grinding devices further comprises a magnet, wherein the magnet is embedded in the panel.

15. The system of claim 14, wherein the magnets are attractable so that the grinding devices are magnetically attracted to each other, thereby effectively making the grinding devices into a singular device.

16. The system of claim 14, wherein each magnet is embedded in the center of its respective panel.

17. The system of claim 1, further comprising imagery and a designated area that is positioned on the back or bottom of at least one of the panels onto which the imagery can be adhered.

18. The system of claim 17, wherein the imagery is adhered by glue or tape or the imagery is a sticker.

19. A grinding system comprising:
a first grinding device; and
a second grinding device;
wherein the grinding devices are configured to grind material between them when the grinding devices meet and rub together;
wherein each grinding device comprises a panel having a surface comprising one or more spikes or thorns thereon for grinding the material;
wherein each grinding device comprises a band attached to the panel to removably secure the grinding device onto a user's hand or one or more fingers of the hand; and
wherein each of the grinding devices further comprises a magnet, wherein the magnet is embedded in the panel.

* * * * *